United States Patent [19]

Leonard

[11] Patent Number: 5,129,602
[45] Date of Patent: Jul. 14, 1992

[54] MULTISTAGE LAUNCH VEHICLE EMPLOYING INTERSTAGE PROPELLANT TRANSFER AND REDUNDANT STAGING

[76] Inventor: Byron P. Leonard, 13700 Tahiti Way, Marina Del Rey, Calif. 90292

[21] Appl. No.: 417,278

[22] Filed: Oct. 5, 1989

[51] Int. Cl.$^5$ .............................................. B64G 1/40
[52] U.S. Cl. ............................... 244/172; 244/158 R; 244/2
[58] Field of Search ................. 244/172, 158 R, 2, 63, 244/135 C, 160

[56] References Cited

U.S. PATENT DOCUMENTS

| | | | |
|---|---|---|---|
| 2,755,046 | 7/1956 | Underwood, Jr. | 244/135 C |
| 3,369,771 | 2/1968 | Walley et al. | 244/158 R |
| 3,782,400 | 1/1974 | Hardison et al. | 244/158 R |
| 3,934,512 | 1/1976 | Adachi | 102/49.4 |
| 3,977,633 | 8/1976 | Keigler et al. | 244/169 |
| 4,012,012 | 3/1977 | Ligler | 244/1 R |
| 4,104,878 | 8/1978 | Chase | 60/245 |
| 4,451,017 | 5/1984 | Marshall | 244/172 |
| 4,471,926 | 9/1984 | Steel, III | 244/158 R |
| 4,505,124 | 3/1985 | Mayer | 62/180 |
| 4,575,029 | 3/1986 | Harwood et al. | 244/172 |
| 4,591,115 | 5/1986 | DeCarlo | 244/135 C |
| 4,609,169 | 9/1986 | Schweickert et al. | 244/169 |
| 4,723,736 | 2/1988 | Rider | 244/172 |
| 4,796,839 | 1/1989 | Davis | 244/158 R |
| 4,807,833 | 2/1989 | Pori | 244/172 |
| 4,834,324 | 5/1989 | Criswell | 244/2 |

FOREIGN PATENT DOCUMENTS 2623774 6/1989 France .................... 244/135 C

OTHER PUBLICATIONS

"Europeans Looking Beyond Ariane 4 to Goal of Independence in Space", Aviation Week & Space Technology, Jun. 9, 1986.
Flight Performance Handbook for Powered Flight Operations (Revised 1963) Ed. J. Frederick White, pp. 5-80 thru 5-85.
"Predicting Launch Vehicle Failure" Aerospace America, Sep. 1989, pp. 36-46.
Titan Background Literature.
Delta Background Literature.
Atlas Background Literature.

Primary Examiner—Joseph F. Peters, Jr.
Assistant Examiner—Christopher P. Ellis
Attorney, Agent, or Firm—Spensley Horn Jubas & Lubitz

[57] ABSTRACT

An improved multistage launch vehicle provides a redundant stage wherein, for N stages in total, N−1 stages will suffice to lift the payload into earth orbit. At least two of the N stages are ignited in parallel at lift off. Interstage coupling and payload stage coupling mechanisms allow the successful completion of the mission and lifting of the payload into orbit irrespective failure of a stage. Interstage propellant transfer is provided to increase efficiency of the parallel stages and allow the increased thrust of parallel ignition at lift off.

19 Claims, 8 Drawing Sheets

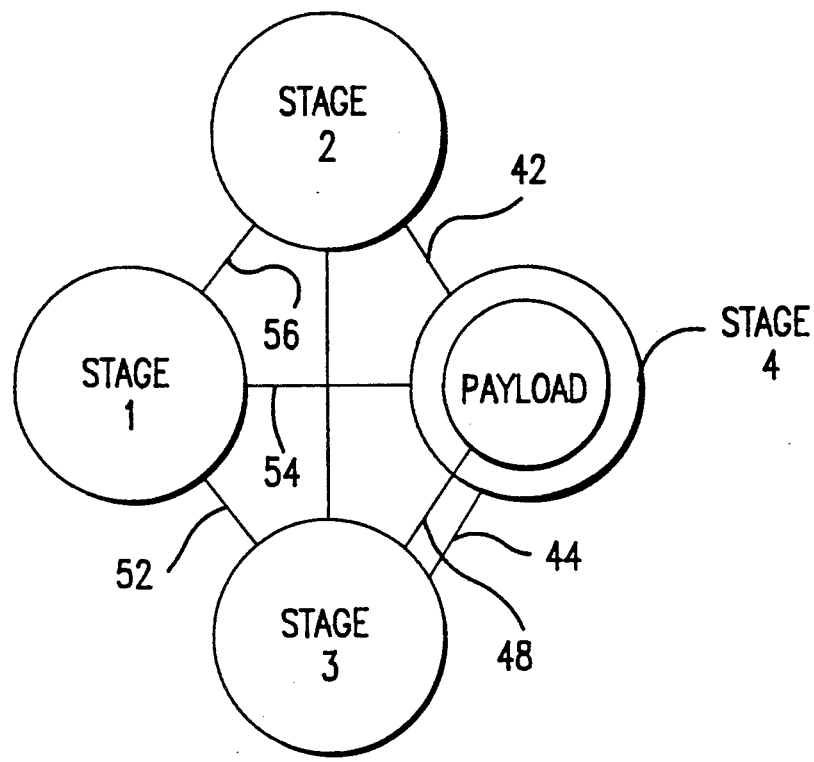
FIG.5
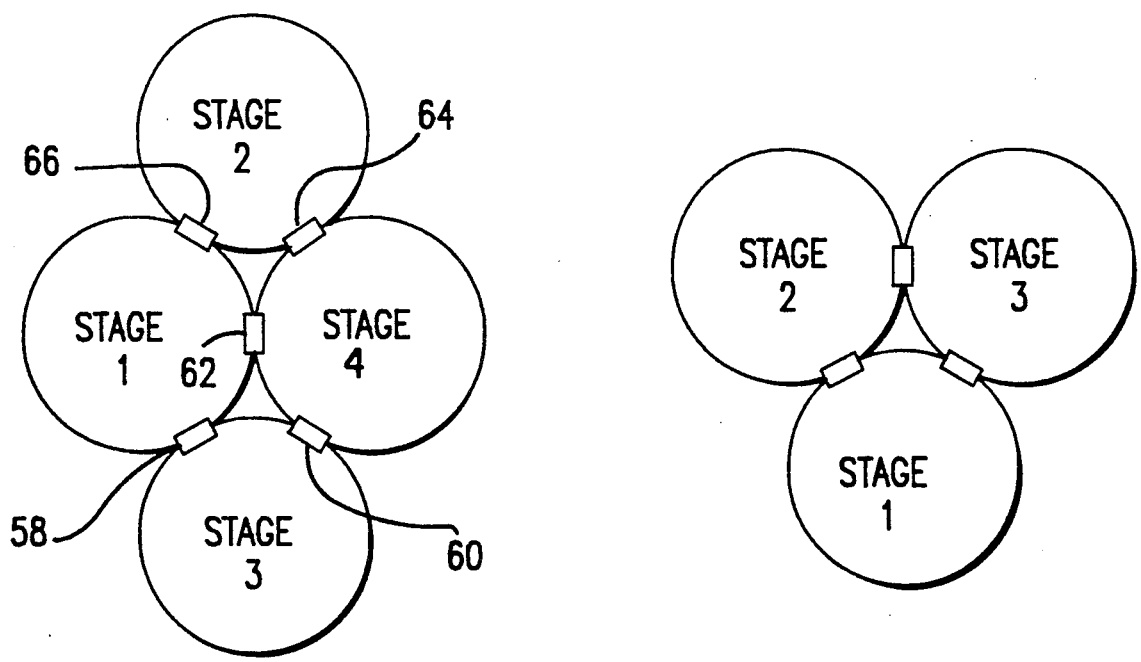
FIG.6
FIG.7

MULTISTAGE LAUNCH VEHICLE EMPLOYING INTERSTAGE PROPELLANT TRANSFER AND REDUNDANT STAGING

BACKGROUND OF THE INVENTION

1. Field of the Invention

The present invention relates to launch vehicles for placing payloads into earth orbit or higher energy orbits which permit the payload to escape from earth. More particularly, the present invention relates to multistage launch vehicles.

2. Description of Prior Art and Related Information

The various approaches to launch vehicle design may be generally classified into single stage and multistage launch vehicle systems. Single stage launch vehicles employ a single thruster stage which includes all the propellant required to deliver a specified velocity to the payload. Since considerable mass is contained in the propellant tanks, engines and thrust structure, which mass becomes unnecessary once propellant therein is expended, a single stage launch vehicle is inherently of less than optimum efficiency. Multistage launch vehicles have accordingly been developed and gained predominance for earth orbit launch applications. Due to their simplicity, however, single stage launch vehicles will in general be cheap and more reliable than multistage launch vehicles.

Accordingly, a single stage vehicle with multiple engines (Atlas) has been utilized in a mode where only engines and part of their thrust structure have been staged at an appropriate time in flight (commonly called a stage and a half, 1.5 stage). The 1.5 stage has two important features: (1) it reduces the weight at a time, in flight when the jettisoned weight is no longer necessary to the efficient performance of the stage, and (2) it reduces the thrust at a time when the propellant weight has been reduced to the point that, with all engines continuing to thrust, the acceleration loads (thrust to weight ratio) delivered to the stage and its payload would be greater than desired from a design standpoint.

Multistage launch vehicles may be characterized in two general categories, serial staged and parallel staged launch vehicles. Serial staged launch vehicles, also referred to as tandem staged launch vehicles, employ two or more vertically aligned stages mounted on top of each other and coupled together in a manner allowing separation during staging. Each stage includes two propellant tanks, a fuel and an oxidizer tank, rocket engine and thrust structure. Upon launch only the lower or first stage is ignited. (The numbering of stages as used herein is in accordance with the convention that the first stage to be separated is referred to as stage 1, and subsequent stages numbered consecutively thereafter in order of separation.) Once the propellant in the first stage is exhausted, the first stage is separated from the second and remaining stages and the second stage is ignited. For an N stage launch vehicle, this staging is repeated N−1 times. For example, for a three stage space launch vehicle, after the expenditure of propellant in the second stage, it is staged and the third stage is ignited and lifts the payload into orbit.

Due to the reduction of weight in the separation of the expended fuel tanks, engine(s) and structure, the series staged launch vehicle is currently employed for many military and civilian applications. Despite the advantages of a series staged launch vehicle, however, series staging inherently has some disadvantages associated therewith.

First of all, only the first stage is ignited at lift off of the launch vehicle and therefore the second and subsequent stages must be ignited upon separation of the prior stages. Since the igniting and early operation of a rocket engine is the most likely time for a failure to occur, the ignition of stages in series introduces increased susceptibility to propulsion failures. Also, a propulsion failure in any stage after the first stage will generally result in mission failure. This is in contrast to a stage and a half parallel staged launch vehicle (discussed below) where the rocket engines are ignited on the ground and the launch can be aborted in the event of a propulsion problem, thus avoiding the loss of the launch vehicle. Secondly, the amount of thrust at lift-off is limited in a series staged launch vehicle to the engine thrust in the first stage. Such limited thrust puts limitations on the amount of payload which may be carried into orbit.

An alternate approach to series staging, parallel staging, employs two or more stages which are ignited at lift off. One or more of the parallel stages are subsequently separated from the payload stage for reduction in overall weight of the launch vehicle during the latter stages of the launch. Such a parallel stage launch vehicle is illustrated in FIG. 1 for the case of a two stage launch vehicle. As shown in FIG. 1, the two stages, stage 1 and stage 2, are placed in a side-by-side or "parallel" manner with the payload mounted on the second stage. The two stages are coupled together by a releasable mechanism illustrated by struts 2 and 4. At launch, the rocket engines of both stage 1 and stage 2 are ignited simultaneously. As shown in FIG. 1, the thrust and propellant tanks of the first stage are generally sized so that it will be depleted of propellant at a time when substantial propellants still remain in stage 2. At this time, the struts 2 and 4 are separated, releasing the first stage and allowing the second stage and payload to continue on into orbit without the added weight of the expended propellant tanks, engines and thrust structure of the first stage. The rocket engines in the first and second stages may also be of different type, so that one stage burns faster than the other. For example, the space shuttle employs two fast burning solid rocket boosters ignited in parallel with the main engines at lift off, which solid rocket boosters are staged after the propellent therein is expended.

The parallel stage launch vehicle approach has some advantages relative to a series staged launch vehicles, nonetheless trade offs result and none of these systems is optimal in all respects. With respect to the parallel stage launch vehicle, the parallel ignition of the rocket engines at lift off increases the thrust at lift off over a series staged with the same total thrust. Since a general condition on any space vehicle launch is that the ratio of its thrust to gross weight, at lift off, should be of the order of 1.2 to 1.6, a parallel stage system can have a larger gross weight, and hence carry more propellant, than a series staged vehicle with the same total thrust. On the other hand, the parallel staged system is less efficient since the weight of the propellant tanks of the second stage is increased over a series stage system since the second stage burns continuously from lift off and hence must carry more propellant than if burned in series. Also, a parallel stage system avoids the problem of igniting second stage engines in flight and the added risk factor associated therewith. Nonetheless, potential problems remain due to the multiple stages in that catastrophic failure could occur in any one of the stages. Due to the increased awareness of the risks of space flight after the Challenger disaster, the importance of which has pervaded the entire space program in recent years, any possible increase in reliability, and hence safety, of a multistage launch vehicle is of the utmost importance.

Accordingly, a need presently exists for a launch vehicle system and method which can further increase the safety and reliability of the launch vehicle. Additionally, a need presently exists for a launch vehicle system and method which can optimize both thrust and performance in such an increased reliability launch vehicle.

SUMMARY OF THE INVENTION

The present invention provides an improved multistage launch vehicle having increased reliability over conventional parallel and series staged launch vehicles.

The present invention further provides an improved multistage launch vehicle combining optimum thrust with efficient use of propellant and high reliability.

The present invention provides an improved multistage launch vehicle employing a redundant stage, with at least two of the stages staged in parallel; i.e., ignited together at lift off. The payload to be lifted into orbit is mounted on the final stage. Each of the stages are interconnected through releasable coupling mechanisms which may be staged at the appropriate time. In addition, at least the second to last stage is coupled to the payload through a releasable coupling mechanism. Due to the addition of a redundant stage, in combination with the releasable coupling of the various stages and payload, upon failure of one of the stages such stage may be immediately severed from the remaining portion of the launch vehicle while the payload is retained coupled to the remaining stages. Additionally, due to the redundant stage, sufficient propellant and thrust remain to lift the launch vehicle and the payload, into a low earth orbit (LEO) rather than having to abort the mission at sub orbital velocity as would normally be the result of a failure of a stage. The resulting enhancement in probability of preserving the payload and mission success is significant whether for manned missions or unmanned missions involving unique or expensive cargo.

In a further aspect of the present invention, interstage propellant transfer and the use of 1.5 stages are combined with the provision of a redundant stage. Such interstage transfer of propellant involves transfer between parallel stages, from an earlier stage to a later stage, while both stages are burning in parallel. For example, for a three stage parallel launch vehicle ignition of all three stages at lift off with full interstage propellant transfer involves propellant transfer from stage 1 and stage 2 to the third stage, and from stage 1 to stage 2. Stage 3, the last stage, carries the payload. Additionally, the stages may employ engine staging, particularly stage 3 where engine thrust loads on the stage and payload can be a serious problem. The interstage propellant transfer may be provided by interstage pumping mechanisms for actively forcing fuel from the propellant tanks of one stage to the other, or preferably by the static and dynamic pressures on the propellant during the launch in combination with a series of valves to selectively provide interstage propellant transfer through a manifold directly to the engines. The valves are actuated to allow the second and third stages to initially burn propellants only from the first stage in a nominal launch. Subsequently, after first stage propellant depletion and staging, stage 3 would burn propellants only from stage 2, until its depletion and staging at which time stage 3 would be fully loaded with propellant. The fuel and oxidized propellant transfer may be provided directly from tank to tank in each stage. Due to the provision of a redundant stage, during an uneventful launch, the depletion of the fuel in the second stage and the staging thereof would leave the third stage fully loaded with propellants, and payload in LEO. If the mission were to place an unmanned payload in a high energy orbit, the third stage would be ignited to perform the last stage of the mission. If the mission were manned transfer to a space station, the astronauts would be transferred to the station and the fully loaded stage 3 would be stored in the station environs to be used subsequently for transfer of a payload to a higher energy orbit. If the mission were unmanned, stage 3 would perform that function immediately. In the event that any one of the three stages failed: 1) the manned mission would be successful, or 2) if unmanned, the payload would be stored at the station to be transferred later to a high energy orbit by a stage 3 from a subsequent successful manned launch.

In an alternate embodiment of the present invention, the interstage propellant transfer and redundant stage features may be provided in a parallel/series staged configuration. In a preferred embodiment, a launch vehicle having two or more parallel stages is provided. Interstage propellant transfer is provided between the parallel burn stages. A final stage is configured in a series staged manner on the last parallel stage. In this embodiment, the interstage propellant transfer system and the multiple interconnections needed for stage redundancy in a fully parallel launch vehicle configuration are reduced. This type of system thus provides a compromise between the advantages of interstage propellant transfer and redundant staging and reduced complexity. Additionally, this configuration may utilize the stage and a half concept to improve vehicle performance and vehicle engine thrust loads on the stage and payload. Also, combinations of interstage propellant transfer 1.5 stage and stage redundancy may be made to provide flexibility for consideration of cost vs. reliability and the complexity for any specific space mission need.

It will be appreciated that the present invention provides an improved launch vehicle and method for increased probability of safe passage to space and mission success over parallel staged or series staged configurations. Additionally, the present invention provides an improved launch vehicle having optimal thrust, including utilization of 1.5 stages and interstage propellant transfer within a redundant stage system. Further features and advantages of the present invention will be appreciated by those skilled in the art from the following detailed description of the invention.

BRIEF DESCRIPTION OF THE DRAWINGS

FIG. 5 is a top schematic view illustrating a four stage parallel redundant stage launch vehicle in accordance with the present invention.

FIG. 6 is a top schematic view illustrating an alternative embodiment of a four stage redundant parallel stage launch vehicle in accordance with the present invention.

FIG. 7 is a top schematic view illustrating an alternative embodiment of a three stage redundant parallel stage launch vehicle in accordance with the present invention.

DETAILED DESCRIPTION OF THE INVENTION

Figure 1:
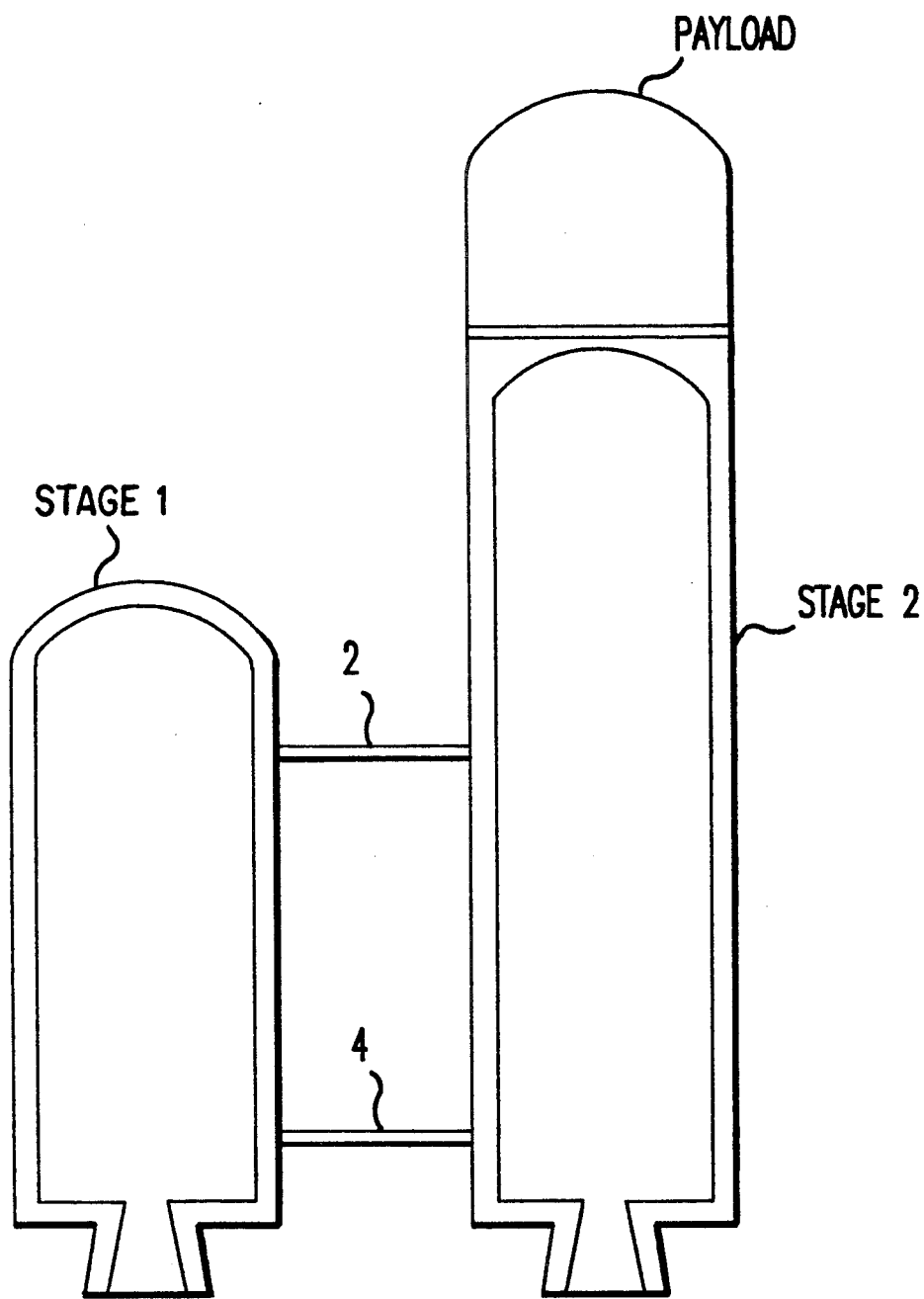
FIG. 1 is a side view illustrating a prior art parallel stage launch vehicle.
Figure 2:
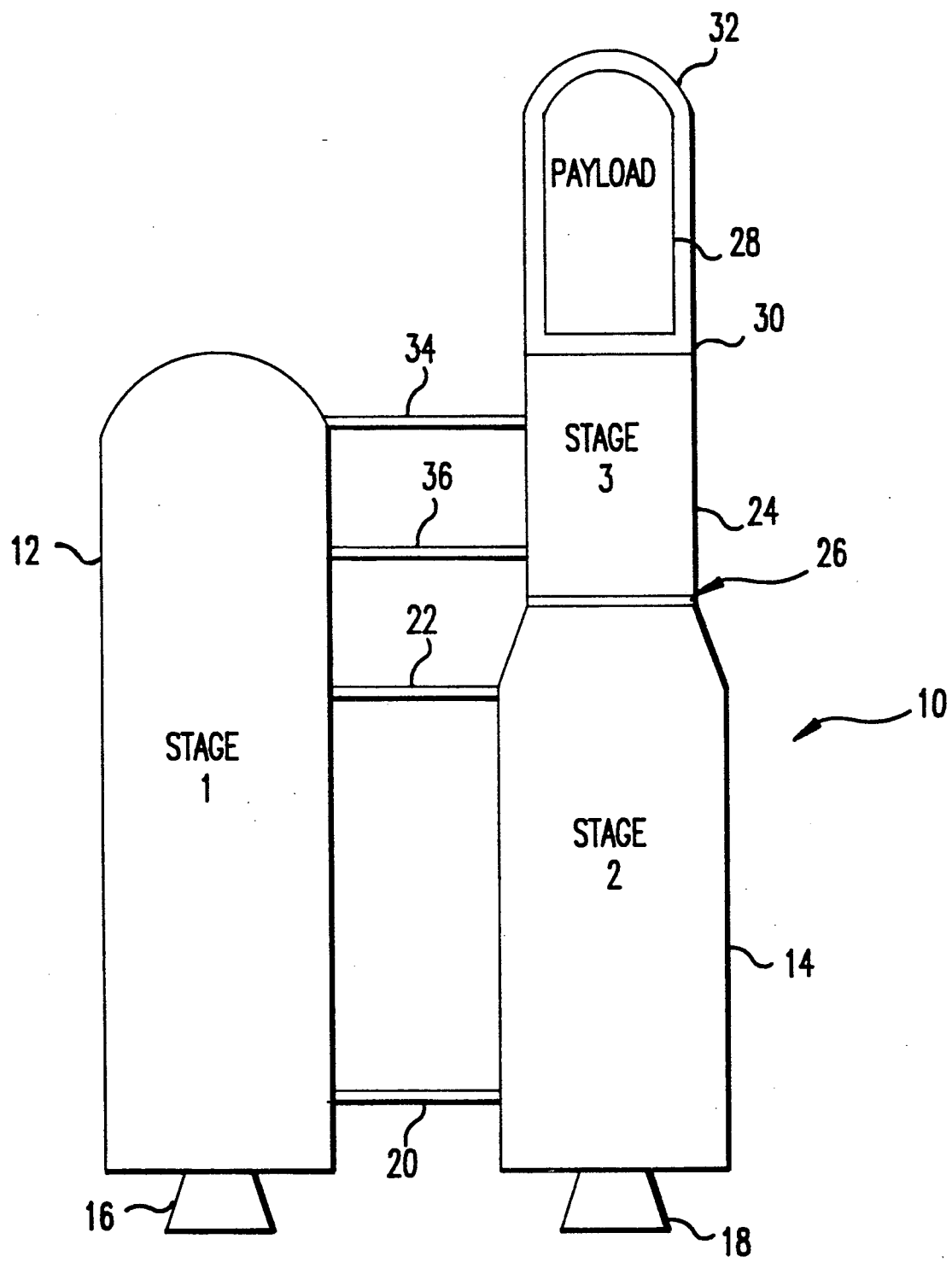
FIG. 2 is a side view illustrating a preferred embodiment of a redundant stage parallel/serial three stage launch vehicle of the present invention.

In FIG. 2, a preferred embodiment of the improved multistage launch vehicle of the present invention is illustrated in a side view. As may be seen from FIG. 2, the improved launch vehicle 10 illustrated has three stages in addition to a payload to be placed into earth orbit. As will be discussed in more detail below, the three stage launch vehicle illustrated in FIG. 2 employs a redundant stage, i.e., during nominal operation of the launch vehicle, the entire propellant in all three stages is not required to place the payload into LEO. Thus, the three stage launch vehicle illustrated in FIG. 2 may be best compared to a two stage launch vehicle, such as the two parallel stage launch vehicle illustrated in FIG. 1 or a two stage series launch vehicle, in terms of function and configuration. However, should the mission be for a high energy orbit (HEO), i.e., geosynchronous orbit or deep space, then all three stages would have to perform successfully. With only two of the three stages performing successfully, the payload would be safe in orbit and stored in the environs of the space station or returned to earth by the shuttle to be launched later to its mission orbit. Also, the present invention may employ additional stages as desired for the performance, cost and reliability considerations for a specific space mission.

Referring to FIG. 2, the improved multistage launch vehicle 10 of the present invention includes a first stage 12 configured in parallel with and mechanically coupled to a second stage 14. Both first stage 12 and second stage 14 have at least propellant tanks (not shown) and a propulsion system 16, 18, respectively. Also, a thrust structure (not shown) is preferably employed for transferring thrust upward from the rocket engines 16, 18 into the propellant tanks and supporting structure of the stage. Since the first stage 12 and second stage 14 are configured in parallel, both propulsion systems 16 and 18 will be ignited simultaneously at lift off. The first stage 12 and second stage 14 are coupled through releasable interstage coupling mechanisms 20 and 22. These are illustrated schematically in FIG. 2 as struts, elongated to more clearly illustrate the connection between the stages, however, in practice, explosive bolts or other, more rigid coupling mechanisms well known in the art will be employed. The lower and upper coupling mechanisms 20, 22 provide both the structural attachments and the separation mechanisms between stages 1 and 2. Preferably, one of the pair carries the thrust loads and the other maintains the proper alignment between stages. In most launch vehicle designs, the lower coupling mechanism 20 will carry the thrust loads and the upper coupling mechanism 22 will maintain the alignment.

In addition to the first stage 12 and second stage 14, a third stage 24 is mounted on top of the second stage 14, configured in a series type configuration therewith. The third stage 24 includes propellant tanks, thrust structure and rocket engine structure (not shown) similar to those of the first and second stages. The second stage 14 and third stage 24 are mounted together through a staging mechanism 26 which may be the same as conventionally employed in series staged launch vehicles. Thus staging mechanism 26 allows the second stage 14 to be severed from the third stage 24 and third stage 24 ignited. As will be discussed below, however, the control system for the staging mechanism 26 differs from that in a conventional series launch vehicle. A payload 28 is mounted on top of the third stage 24 through a staging mechanism 30. As illustrated in FIG. 2, the payload 28 may typically be covered with a fairing 32 which shields the payload 28 during the launch and provides reduced air resistance for the launch vehicle 10. The fairing 32 is ejected after the launch vehicle 10 exits the earth atmosphere. An additional set of interstage coupling mechanisms 34, 36 are provided between the first stage 12 and the third stage 24. As will be described in more detail below, the additional set of interstage coupling mechanisms 34, 36 allow the second stage 14 to be staged before the first stage 12 in case of a failure of the second stage 14. This staging capability allows the third stage 24 and payload 28 to continue in the launch sequence, along with the first stage 12, after failure and ejection of the second stage 14.

The relative dimensions and capacities of the propellant tanks of the first stage 12, second stage 14 and third stage 24 are chosen to allow any two of the three to place the payload in LEO.

The significance of the redundant staging system as illustrated generally in FIG. 2 may be appreciated by evaluation of various launch scenarios. These are set out below in Table 1.

TABLE 1

| Launch Vehicle Sequence | Staging Sequence |
|---|---|
| Scenario A - All components successful | |
| 1. Depletion of propellant in stage 1 | Interstage coupling mechanisms, 20, 22, 34, 36 separate, staging of stage 1 |
| 2.1 Depletion of propellant in stage 2 - for LEO mission | Series staging mechanism 26 separates, staging stage 2 leaving loaded stage 3 and payload in LEO |
| 2.2 Depletion of propellant in stage 2 - for HEO mission | Series staging mechanism 26 separates, staging stage 3 - stage 3 ignition |
| 3.1 Payload becomes operational in LEO | Series staging mechanism 30 separates, staging stage 3 from the payload |
| 3.2 Depletion of propellant in stage 3 | Series staging mechanism 30 separates, staging stage 3 from the payload |
| Scenario B - Stage 1 Fails | |

TABLE 1-continued

| Launch Vehicle Sequence | Staging Sequence |
| --- | --- |
| 1. Stage 1 fails | Interstage coupling mechanisms 20, 22, 34, 36 separate, jettisoning the failed stage 1 |
| 2. Depletion of propellant in stage 2 | Series staging mechanism 26 separates, staging stage 2 with stage 3 and payload suborbital - stage 3 ignition |
| 3. Stage 3 shutdown with payload in orbit | Series staging mechanism 30 separates, staging stage 3 from the payload |
| 4. Payload is placed in LEO | |
| 4.1 Payload becomes operational in HEO | |
| Scenario C - Stage 2 Fails (before Stage 1 burnout) | |
| 1. Stage 2 fails | Interstage coupling mechanisms 20, 22 and series staging mechanism 26 separate, jettisoning stage 2 |
| 2. Depletion of propellant in stage 1 | Interstage coupling mechanisms 34, 36 separate, staging 1 - stage 3 ignition |
| 3. Stage 3 shutdown with payload in orbit | Staging mechanism 30 separates, staging stage 3 from the payload |
| 4. Payload is placed in LEO | |

As may be seen from review of Table 1, the nominal launch sequence, Scenario A, which involves all stages successfully operating, results in stage 3 and the payload successfully achieving the desired earth orbit. To reach LEO, stage 3 will not have been ignited and will thus contain a full tank of propellant. This may be used to further position the payload to a higher energy orbit, if that is the primary mission objective. Alternatively, and as discussed in more detail below, in the case of a manned launch to a space station the unused upper stage with its propellants could be stored to be used subsequently to place a payload in a higher energy orbit, i.e., for a geosynchronous or an interplanetary mission originating from earth orbit.

As illustrated in Scenario B, if during the launch the first stage fails, the interstage coupling mechanisms 20, 22, 34 and 36 separate staging the first stage while the second stage continues to burn. Upon depletion of the propellant in the second stage, the series staging mechanism 26 separates staging second stage 14. At this time stage 3 is ignited and subsequently places the payload in LEO.

As illustrated in Scenario C, if stage 2 fails (when stage 1 is not yet depleted), the interstage coupling mechanisms 20 and 22 are separated and the series staging mechanism 26 is separated staging the second stage. When stage 1 is depleted it is staged by separation of interstage coupling mechanisms 34, 36, at which times stage 3 is ignited. (If stage 2 fails after staging of stage 1, stage 2 is immediately jettisoned by separation of series staging mechanism 26 and stage 3 ignited to complete the mission to LEO.)

It will thus be appreciated that the addition of a redundant stage, in the illustrated embodiment of FIG. 2, allows completion of the mission of placing the payload in LEO in Scenario B and Scenario C which would otherwise result in the mission being aborted at sub orbital velocity. Assuming the successful launches, Scenario A occurs, in a high percentage of manned missions to LEO, a result of the redundant stage capability will be the lifting into orbit of stage 3 with fully loaded propellant tanks. As discussed below, this additional result can have significant advantages in the case of a space station in earth orbit and/or where geosynchronous and interplanetary missions are originated from and fueled from an earth orbit. Other types of military and civilian applications of space may also exploit the lifting into orbit of the propellant as an automatic concomitant of the redundant stage launch vehicle system of the present invention.

Another embodiment of the three stage, redundant stage vehicle described above, shown in FIG. 3, is a first stage which consists of two boosters, commonly referred to as "strap on booster", which provide increase thrust and performance. However, they perform as a single stage in all of the functions described for the launch vehicle shown in FIG. 2.

Figure 3:
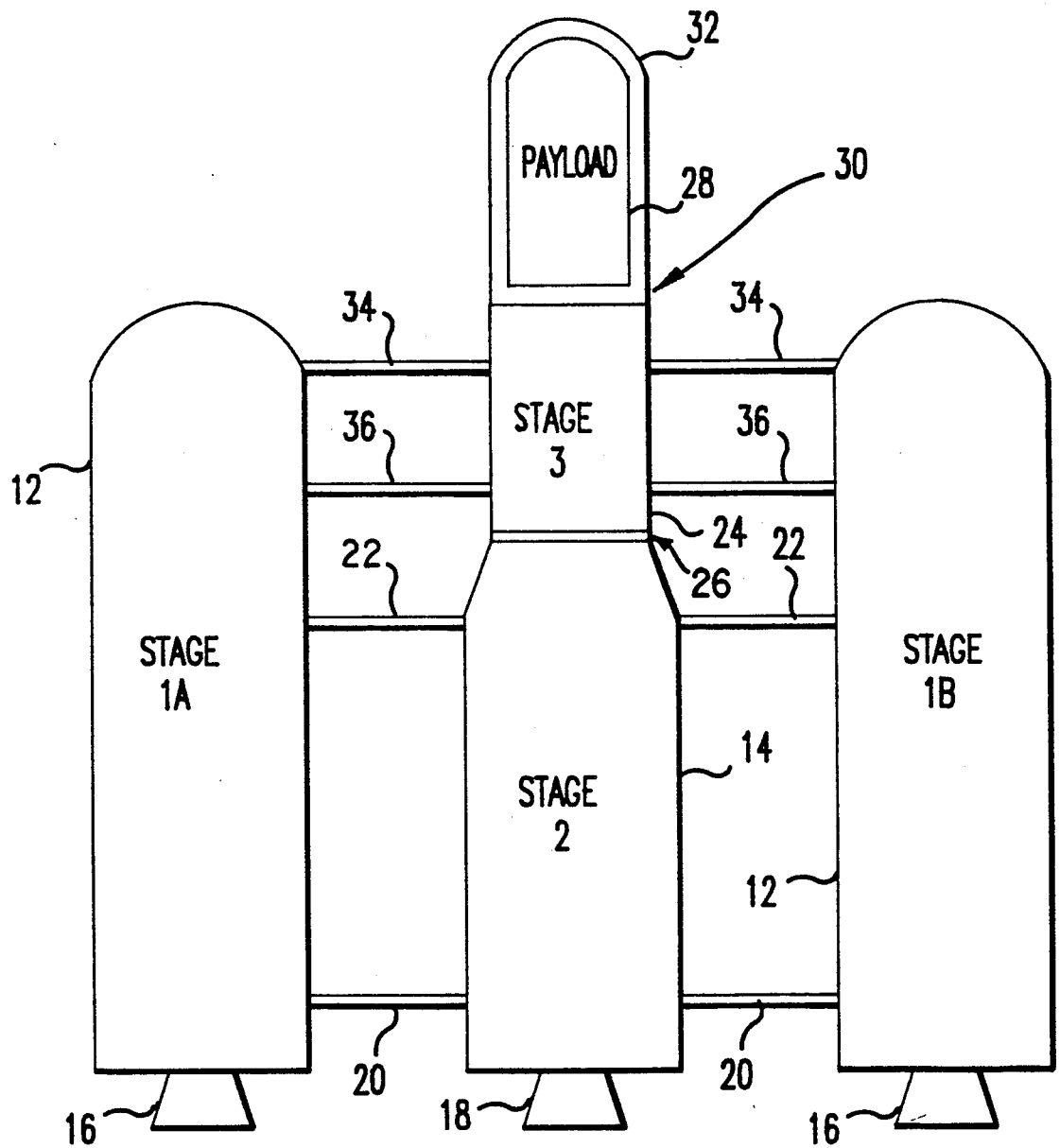
FIG. 3 is another embodiment of the launch vehicle shown in FIG. 2 where two identical boosters are utilized as stage 1.
Figure 4A:
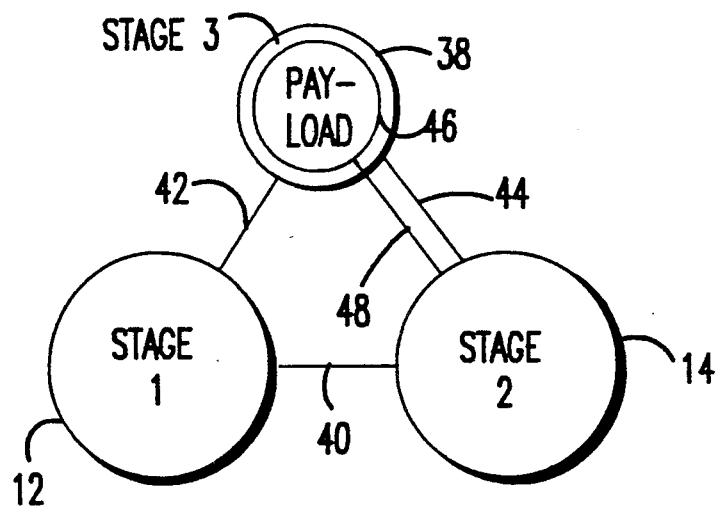
FIG. 4(a) is a top schematic view.
Figures 4B, 4C:
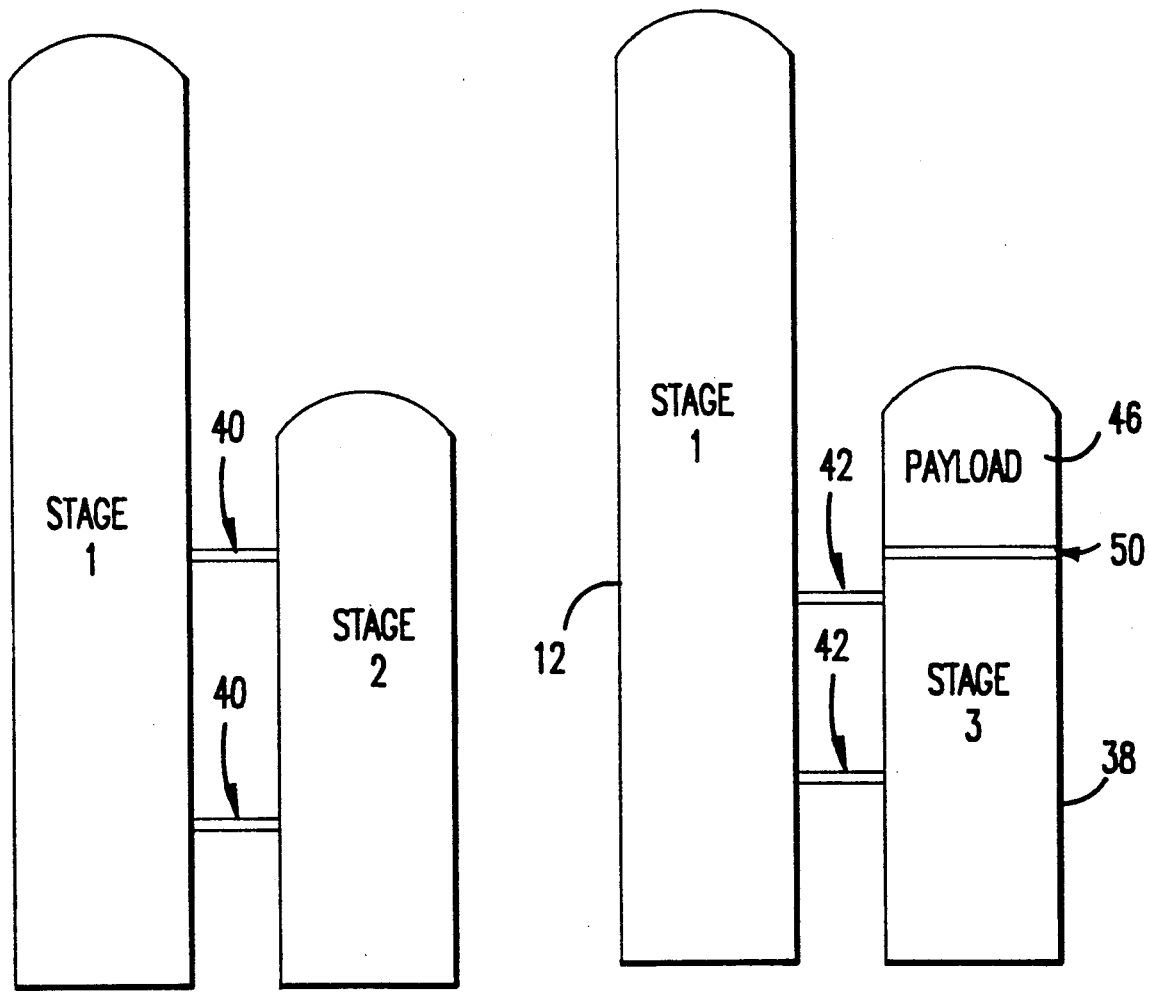
FIGS. 4(b), 4(c), 4(d) and 4(e) are side views, of the respective stages of a preferred embodiment of a three parallel stage redundant stage launch vehicle of the present invention.
Figure 4E:
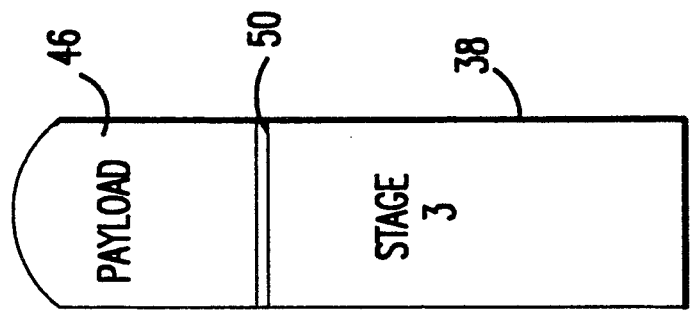
Figure 4D:
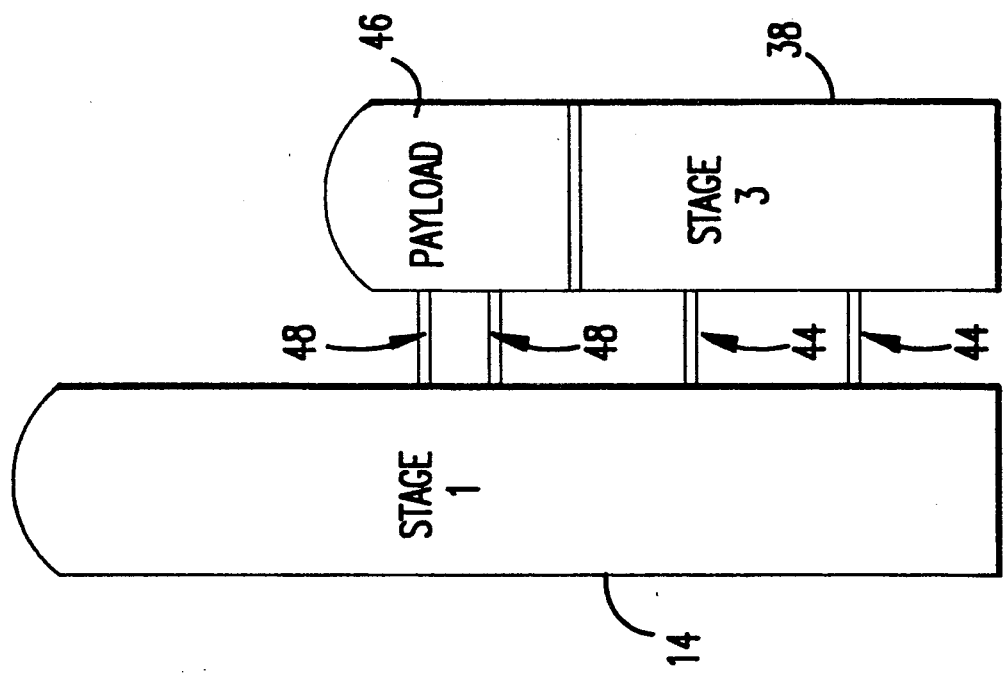

Referring to FIGS. 4(a), 4(b), 4(c), 4(d) and 4(e), an alternate embodiment of the improved launch vehicle of the present invention is illustrated with a fully parallel stage configuration. As shown in FIG. 4(a), in a top schematic view, the redundant stage launch vehicle of the present invention in a fully parallel configuration employs, in addition to first and second stages 12, 14, a third stage 38. In contrast to the situation discussed above in relation to FIG. 2, the third stage 38 is ignited at lift-off in parallel with the first and second stages 12, 14. As shown schematically in FIG. 4(a) each of the three stages 12, 14 and 38 are coupled to each other by interstage coupling mechanisms 40, 42 and 44. These interstage coupling mechanisms 40, 42 and 44 are illustrated in side views in FIGS. 4(b), 4(c) and 4(d). As in the case of the interstage coupling mechanisms described in relation to FIG. 2, interstage coupling mechanisms 40, 42, 44 may comprise explosive bolts or other releasable coupling mechanisms providing the desired thrust transfer capability. The payload 46 is mounted on the third stage 38. As illustrated schematically in FIG. 4(a) and in a side view in FIG. 4(d), at least the second stage 14 is coupled to the payload 46 through an additional interstage coupling mechanism 48. Since third stage 38 is ignited at lift-off, the possibility exists of its failure. Additional coupling 48, in combination with a staging mechanism 50, allows stage 3 to be separated and ejected in case of its failure. In such case, the payload 46 and remaining stages 1 and 2 may nonetheless continue to lift the payload 46 into orbit. In other words, since all three stages are now configured in parallel and are ignited at lift off, an additional scenario presents itself in addition to the three scenarios discussed above in relation to FIGS. 2 and 3 in that stage 3 may fail and be jettisoned at any time during the launch. This is reflected in the following Table 2 which generally corresponds to Table 1 with the variation in interstage coupling mechanisms which must be separated to stage the appropriate failed or expended stage and with the addition of Scenario D corresponding to a failure in stage 3 during launch to LEO.

TABLE 2

| Launch Vehicle Sequence | Staging Sequence |
| --- | --- |
| Scenario A - All components successful | |
| 1. Depletion of propellant in stage 1 | Interstage coupling mechanisms, 40, 42 separate, staging stage 1 |
| 2.1 Depletion of propellant in stage 2 - for | Interstage coupling mechanisms 44, 48 separate, |

TABLE 2-continued

| Launch Vehicle Sequence | Staging Sequence |
| --- | --- |
| LEO mission | staging stage 2 leaving loaded stage 3 and payload in LEO |
| 2.2 Depletion of propellant in stage 2 - for HEO mission | Interstage coupling mechanisms 44, 48, separate, staging stage 2 - stage 3 continues to thrust |
| 3.1 Stage 3 shutdown with payload in LEO | Series staging mechanism 50 separates, staging stage 3 from the payload |
| 3.2 Depletion of propellant in stage 3 | Series staging mechanism 50 separates - staging stage 3 from the payload |
| 4. Payload becomes operational in LEO | |
| 4.1 Payload becomes operation in HEO | |
| Scenario B - Stage 1 Fails | |
| 1. Stage 1 fails | Interstage coupling mechanisms 40, 42 separate, jettisoning stage 1 |
| 2. Depletion of propellant in stage 2 | Interstage coupling mechanisms 44, 48 separate, staging stage 2 |
| 3. Stage 3 shutdown with payload in orbit | Series staging mechanism 50 separates, staging stage 3 from the payload |
| 4. Payload is placed in LEO | |
| Scenario C - Stage 2 Fails (before Stage 1 burnout) | |
| 1. Stage 2 Fails | Interstage coupling mechanisms 40, 44 and 48 are separated, jettisoning stage 2 |
| 2. Depletion of propellant in stage 1 | Interstage coupling mechanism 42 separates, staging stage 1 |
| 3. Stage 3 shutdown with payload in orbit | Series staging mechanism 50 separates, staging stage 3 from the payload |
| 4. Payload is placed in LEO | |
| Scenario D - Stage 3 Fails | |
| 1. Stage 3 fails | Interstage coupling mechanisms 42, 44 and staging mechanism 50 separate, jettisoning stage 3 |
| 2. Depletion of propellant in stage 1 | Interstage coupling mechanism 40 separates, staging stage 1 |
| 3. Stage 2 shutdown with payload in orbit | Interstage coupling mechanism 48 separates, staging stage 2 from the payload |
| 4. Payload is placed in LEO | |

In either preferred embodiments, FIGS. 2, 3 or 4, the stage 2 must be larger than the stage 2 in a prior art parallel burn launch vehicle, FIG. 1, since the stage 2 must function as a stage 1 should the stage 1 fail at lift off. Thus, to provide a practical implementation of such preferred parallel ignition at lift-off, interstage propellant transfer, discussed below, is required.

An additional modification for stage redundancy in a fully parallel launch vehicle configuration is required to satisfy the requirement that the launch vehicle guidance system place the payload in orbit successfully. Thus, against the contingency of Scenario D that Stage 3 fails and has to be jettisoned, a modification to the guidance system is required over a parallel stage launch vehicle without a redundant stage. Two alternate approaches may be adopted for the guidance function. One is to place the guidance module in the payload providing a direct interface to the avionics of both Stages 3 and 2. The alternate approach is to install separate guidance modules in Stages 2 and 3 with self-monitoring and handover capabilities from one to the other to achieve an added measure of redundancy in guidance.

In an alternate embodiment, the redundant stage launch vehicle of the present invention may be provided in a four stage vehicle by adding a stage zero to the three stage vehicle with redundant stage described above. This is illustrated schematically in FIG. 5 for a fully parallel configuration. Three additional interstage coupling mechanisms 52, 54, 56 are employed to releasably couple stage zero to stages 1, 2 and 3, with the other attachments unchanged from their configurations, as shown in FIG. 3. In general, N stages may be provided in parallel with N−1 being capable of placing the payload in orbit.

It will be appreciated that although the interstage coupling illustrated in FIG. 5 provides maximum flexibility for staging the various stages upon occurrence of alternate scenarios, for structural and cost reasons, the interstage couplings may be reduced while still exploiting the advantageous features of the redundant staging of the present invention. For example, a configuration employing five interstage coupling mechanisms 58, 60, 62, 64 and 66 is illustrated in FIG. 6. The configuration in FIG. 6 also illustrates an interstage coupling system which reflects a more structurally stable coupling system, using, for example, explosive bolts as opposed to extended struts as illustrated in FIGS. 2, 3, 4 and 5. Additionally, in the configuration of FIG. 6, a coupling at least between stage 2 and the payload (not shown) is optimally provided. In FIG. 7, a three stage parallel redundant stage configuration employing an interstage coupling mechanism analogous to that discussed in relation to FIG. 6 is illustrated. In relation to the configurations of both FIGS. 4, 5 and 6, it will be appreciated that alternative combinations of coupling between the payload and stages are also possible to provide added flexibility in the various scenarios. Accordingly, the specific configurations illustrated above should be considered as only illustrative and not exhaustive of the advantageous features of the present application.

The effect on launch vehicle reliability of operating a three stage vehicle with redundant staging compared to a two stage vehicle, without redundant staging, can be projected by using representative probabilities for success and failure of the individual stages as shown in Table 3.

TABLE 3

| | Assumed Range of Individual Stage Reliabilities | | |
| --- | --- | --- | --- |
| Probability of Success | Probability of Benign Failure | Probability of Catastrophic Failure | Total Probability of Failure |
| 0.98 | 0.017 | 0.003 | 0.02 |
| 0.99 | 0.008 | 0.002 | 0.01 |

(In Table 3, the ratio of catastrophic failure probability to the benign failure probability has been assumed to be approximately one in six to one in four for 0.98 and 0.99 stage probabilities of success, respectively.) Using the assumed values for the critical probabilities of success and failures of individual stages, the resulting probabilities for two and three stage vehicles, with and without redundant staging, can be projected. The results are shown in Table 4. The probabilities that the mission will fail due to two of three stages filing benignly are approximately 3 $(0.02)^2$ (0.98) and 3 $(0.01)^2$ (0.99) for the two individual stage reliability assumptions. That is, the probabilities are approximately 0.0012 and 0.0003, respectively. The individual stage catastrophic failure rates shown in Table 3 are approximately additive. These, in turn, are approximately additive to the mission failure probabilities due to excess benign failures. The approximate failure probabilities for the two stage launch vehicle without redundant staging and the three stage vehicle with redundant staging are shown in Table 4.

TABLE 4

Two and Three Stage Launch Vehicle Probabilities of Mission Failure

| Probability of Success | | Probability of Failure | |
|---|---|---|---|
| Individual Stage | 2-Stage Vehicle | 2-Stage Vehicle | 3-Stage Vehicle with Redundant Staging |
| 0.98 | 0.96 | 0.04 | 0.01 |
| 0.99 | 0.98 | 0.02 | 0.009 |

(Note that the failure probability of a multi-string voting guidance system should be of the order of 0.001 and therefore is relatively small as compared to the other failure probabilities.) The expected number of launches between failures is simply the reciprocal of the expected failure probabilities shown in Table 4. The results are shown in Table 5.

TABLE 5

Expected Number of Launches Between Mission Failures

| Two Stage Vehicle Probability of Success | 2-Stage Vehicle | 3-Stage Vehicle with Redundant Stage |
|---|---|---|
| 0.96 | 25 | 100 |
| 0.98 | 50 | 100 |

Thus, based upon the assumed parametric values, the expected number of failures over a long-term space program should be reduced by a factor of two to four by the introduction of a redundant stage. This is clearly of utmost significance for manned missions and also for missions involving unique or extremely valuable cargo.

Figure 8:
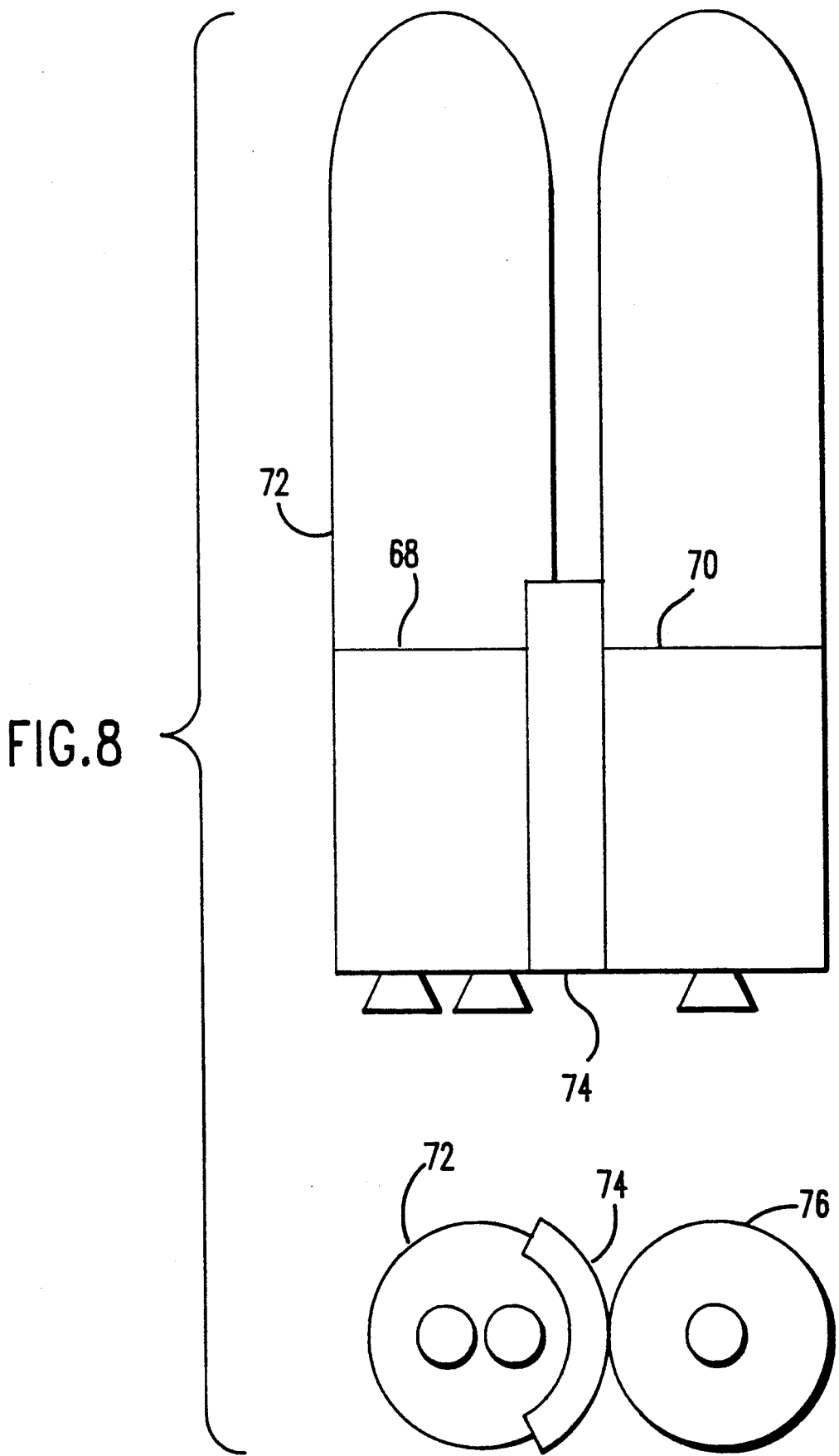
FIG. 8 is a side and bottom views of a fire wall/armor shield to protect one stage from another that experiences a catastrophic failure.

Based upon U.S. history of flight failures the largest number of catastrophic stage failures will be due to catastrophic propulsion system failures which occur in one stage and may propagate to another. Recent examples of this are the Challenger and a Titan failure where the initial failures were in the solid rocket motors which destroyed the core liquid rocket stages. For liquid rocket stages the preponderance of such failures will occur in the manifold/engine area. FIG. 8 presents the concept of a fire wall/armor shield protecting those areas to reduce the propagation of propulsion system catastrophic failures within and between contiguous stages. On each stage, the bottom propellant tank wall 68 and 70 is shielded from catastrophic failures which originate in the manifold/engine areas. On the lower stage 72 the side wall has a shield 74 to deter propagation of the failure between the lower and the upper contiguous stages 72 and 76. Such protection could slow the process of the failure to allow more time for jettisoning the failing stage thus reducing the stage catastrophic failure probabilities.

In a further aspect of the present invention, interstage propellant transfer is provided in flight between parallel stages, from shorter to longer burning stages, thus reducing the amount of propellant required in the longer burning stage(s) at lift-off. This has the effect of reducing the size and weight of the longer burning stage(s) thus increasing the performance of the launch vehicle for a given amount of total thrust. In combination with a redundant stage, this allows the provision of increased reliability, with minimal significant penalties in propellant requirements.

Figure 9:
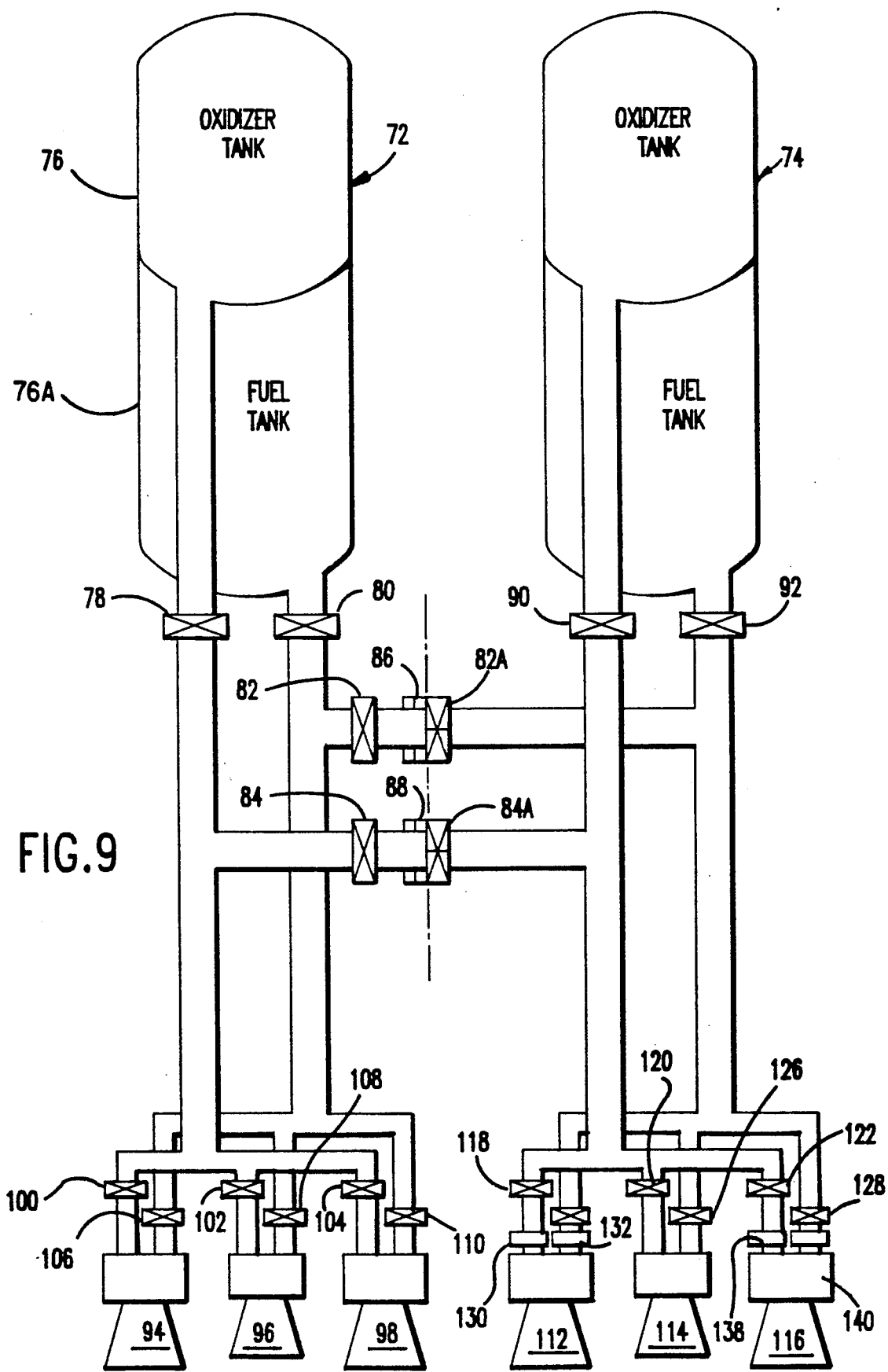
FIG. 9 illustrates the propellant manifold for a two stage parallel burn vehicle with 1.5 stage, and redundant stage capabilities.

For a three stage parallel/series configuration, the preferred embodiment for controlling propellant utilization is a manifold interconnecting the parallel stages 1 and 2 in the vehicle. A manifold for two stages, stage 1, 72 and stage 2, 74 is shown in FIG. 9. The oxidizer tank 76 and fuel tank 76A of stage 1 are manifolded through stage 1 outlet valves 78 and 80 through pairs of manifold valves 82, 82A and 84, 84A which are required to stage 1 or 2, 72 or 74 first. Associated with the manifold valves 82, 82A, 84 and 84A are quick disconnects 86 and 88 which permit separation of the two stages at any time. Stage 2, 74 has oxidizer and fuel outlet valves 90, 92 similar to stage 1, 78, 80. Stage 1 has three engines 94, 96, 98 which have oxidizer inlet valves 100, 102 and 104 and fuel inlet valves 106, 108 and 110. Stage 2 also has three engines 112, 114 and 116 which have oxidizer inlet valves 118, 120 and 122 and fuel inlet valves 124, 126, 128. Additionally, stage 2 is a stage and a half in that the outboard engines 112 and 116 can be staged at any time during the stage 2 burn by means of quick disconnects just below the inlet vales 130, 132, 138 and 140. Starting with lift off in the sequence events, all valves are open except second stage outlet valves 90 and 92. Thus during first burn all engines are utilizing propellants from stage 1 tanks only. To initiate the end of stage 1 burn, valve changes and disconnect activations are, in rapid sequence:

Open stage 2 tank outlet valves 90 and 92. Close all first stage engine inlet valves 100, 102, 104, 106, 108 and 110. Close manifold valves 82A and 84A. Activate disconnects 86, and 88. Close stage one outlet valves 78 and 80.

Should stage 1 fail during first burn the separation sequence described above is initiated at that time. Should stage 2 fail during first burn, two design options exist, as described earlier, jettison stage 2 immediately or retain stage 2 burning its propellant with stage 1 engines. In the first option the following actions occur in rapid sequence.

Close all engine inlet vales on stage 2, 118, 120, 122, 124, 126 and 128. Close manifold valves 82, 82A, 84 and 84A. Activate disconnects 86 and 88.

For the second option were stage 2 is retained and stage 1 engines burn all of the propellants from stages 1 and 2, the following sequence of actions would be taken to burn the propellants in stage 2 followed by burning the propellants in stage 1:

Close all the engine outlet valves on stage 2, 118, 120, 122, 124, 126 and 128.

Activate engine separation mechanisms on stage 2, 130, 132, 134 and 140.

Open stage 2 propellant tank outlet valves 90 and 92. Close stage 1 propellant tank outlet vales 78 and 80.

This status of the manifold permits burning of propellants from stage 2 tanks while holding propellants in stage 1. Subsequently, just before depletion of propellant tanks in stage 2:

Open stage 1 propellant tank outlet valves 78 and 80.
Close stage 2 propellant tank outlet valves 90 and 92.

Another embodiment of two stage parallel burn is for stage 1 to consist of two boosters 1A and 1B each of which has manifolding to stage 2 identical to that described in FIG. 9. This would provide for jettisoning of either booster should it fail. This identical manifold would be used for a three stage parallel burn configuration, i.e., stages 1A, 1B and 2 would become stages 1, 2 and 3 simply by changing the timing and sequencing of the valves and separation disconnects. In this case, the same option exists for retaining stage 3 as for stage 2 described above.

In general, for N stages burning in parallel each of the N−1 stages would be manifolded to the Nth stage as shown in FIG. 9. This, in effect, would provide manifolding among the tanks of all stages through the Nth stage manifold segment. Thus, during each of the N burns, propellant could be supplied to all of the engines participating in that burn from any combination of stage tanks present during that burn.

A specific, quantitative example will best illustrate how interstage propellant transfer between two contiguous stages, burning in parallel, serves to improve the performance of a launch vehicle. Although this is true for any number of stages in a launch vehicle, a two-stage launch vehicle will be used to demonstrate the principle. The general effect of interstage propellant transfer between two stages burning in parallel can be best understood by comparing that case with similar stages burning in series. For two stages having thrusts $T_1$ and $T_2$, respectively, operated in series, the thrust levels are:

$T_1$ for the thrust at lift-off, and $T_2$ at second stage ignition, after first stage separation.

If the stages are operated in parallel, the thrust levels are:

$T_1+T_2$ for the thrust at lift-off, and $T_2$ after first stage burnout and separation.

A condition on any space launch vehicle launched from the earth's surface is that the ratio of its thrust to gross weight, at lift-off, be of the order of 1.2 to 1.4 to control velocity losses due to earth gravity and aerodynamic drag. Thus, two stages burning in parallel can carry more propellant than the stages with the same total thrust burning in series. On the other hand, the second stage in parallel burn must carry more propellant than if it burned in series (because it burns longer) thus making it heavier. Propellant transfer from the first to the second stage is designed to take advantage of the former and essentially remove the negative effect on performance of the latter.

A simple representation of the dry weight (DW) of a stage (weight without propellant) is the fixed weight of the engines and structure (a) plus the weight of the tank which is proportional to the weight of the propellant (P) times the proportionality factor (B). This relation is set out in equation (1):

$$(1) \quad DW = A + BP \tag{1}$$

Defining the propellants burned in stages 1 and 2, during parallel first and second burns as $P_{1,1}$, $P_{2,1}$ and $P_{2,2}$ (where the first subscript refers to the stage and the second to the number of the burn, i.e., first or second burn), the weights of the stages without interstage propellant transfer can be expressed as follows:

$$DW_1 = A_1 + B_1 P_{1,1} \tag{2}$$

$$DW_2 = A_2 = A_2 + B_2(P_{2,1} + P_{2,2}) \tag{3}$$

Since each pound of $DW_2$ attains the same velocity as the payload, the objective is to load more propellant on stage 1 and less on stage 2 for lift-off conditions thus reducing the size and weight of $DW_2$. The optimum loading of the two stages would be the same as to optimize for payload weight as though the two stages were burning in series with the appropriate propellant being supplied from the first stage to both the stages 1 and 2 propulsion systems during first burn. Thereafter, the second stage tank would supply propellant during second stage burn.

With interstage propellant transfer, the DW equations shown in equations (2) and (3) become:

$$DW_1^1 = A_1^1 + B_1^1(P_{1,1} + P_{2,1}) \tag{4}$$

$$DW_2^1 = A_2^1 + B_2^1(P_{2,2}) \tag{5}$$

(Note that the parameters A and B may be different for stages of very different sizes.)

The effect of pumping $P_{2,1}$ propellants from the first to the second stage during first burn is thus to increase and decrease the dry weights (DW) of the first and second stages by equations (4)-(2) and (3)-(5), respectively. Also, given that the propellant allocations were made as though the stages were burning in series (optimally), the parallel burn performance should be greater than that for a series burn for the same total thrust because the thrust and propellant, for parallel burn, are greater at lift-off. Thus, it can be seen that, with interstage propellant transfer, the advantages of increased reliability and thrust at lift-off of space launch parallel burn vehicles can be achieved with increased performance by utilizing interstage propellant transfer.

The operational features and requirements of the improved launch vehicle of the present invention employing redundant staging, interstage propellant transfer and the 1.5 stage are best appreciated in reference to a specific example. Accordingly, the following describes a specific launch configuration generally corresponding to the parallel stage system of FIG. 3 as compared to a more conventional parallel two stage launch vehicle such as illustrated in FIG. 1. The operation of such launch vehicle of the present invention are described in the context of a current U.S. space mission, e.g., a manned launch to low earth orbit (nominal 100 n.mi., 28.5° inclination).

In a U.S. mission to low earth orbit, approximately 30,000 ft/sec is required to achieve low earth orbit, including velocity losses due to gravity and aerodynamic drag. In a two parallel stage launch vehicle, such as illustrated in FIG. 1, utilizing the same propellant, each stage should contribute approximately one-half of the total required velocity, i.e., 15,000 ft/sec. (Actually, stage 1 would have somewhat more velocity capability than stage 2 because more velocity losses due to gravity and drag are made up during first burn.) A redundant third stage 38 is provided such that each of the stages can increase the velocity of itself and its cargo (upper stage(s) plus payload) by approximately 15,000 ft/sec. Accordingly, any two of the three stages can place the payload into low earth orbit. To achieve this capability the following thrust (T) to gross vehicle weight (GRW) and payload weight (PLW) conditions must be met at lift-off with parallel burn (where the subscript indicates the stage and the values are at lift-off) in order to deal with velocity losses due to gravity and atmospheric drag.

Scenario A - All stages functionally correctly $$\frac{T_1 + T_2 + T_3}{GRW_1 + GRW_2 + GRW_3 + PLW} = 1.2\text{-}1.6$$

Scenario B - Stage 1 fails immediately after lift-off $$\frac{T_2 + T_3}{GRW_2 + GRW_3 + PLW} = 1.2\text{-}1.6$$

Scenario C - Stage 2 fails immediately after lift-off $$\frac{T_1 + T_3}{GRW_1 + GRW_3 + PLW} = 1.2\text{-}1.6$$

Scenario D - Stage 3 fails immediately after lift-off $$\frac{T_1 + T_2}{GRW_1 + GRW_2 + PLW} = 1.2\text{-}1.6$$

After successful burnout of either stage 1 or stage 2, the velocity losses are reduced to the point that the thrust-to-weight requirement in stage 3 is lower, i.e.:

$$\frac{T_3}{GRW_3 + PLW} \approx 0.6$$

If the first two stages were operating as a normal two stage vehicle to low earth orbit, the requirement for stage 2 would be that shown for stage 3. Thus, the redundant stage thrust-to-weight requirement for stage 2 is substantially greater than for the normal operational mode. This makes the use of interstage propellant transfer on stages 1 and 2 more imperative for a vehicle with redundant stage than for a vehicle operating in the normal mode.

It will be appreciated from the foregoing that the combination of redundant stage parallel or series parallel staging with interstage propellant transfer provides significant advantages both in terms of reliability and performance. In particular, for manned transfer from earth to a space station only two of the three stages would be required to complete the mission. Thus, the third stage would generally arrive on orbit fully loaded with propellant. This would provide considerable potential for on-orbit operations. Some potential applications are as follows:

1. The three stage launch vehicle with redundant stage described above, when all three stages perform successfully, has the capability of delivering velocities to the payload to achieve Geosynchronous orbit or escape. In the limited times that the redundant stage is required, stage 3 would arrive in low earth orbit with insufficient propellant to achieve such missions. Under those circumstances, it could be refueled at a tank farm near the station and sent on to complete its mission.

2. Each successful manned launch on the three stage launch vehicle with the redundant stage would place stage 3 in low earth orbit fully loaded with propellant. Under these circumstances, the manned spacecraft and astronauts could be transferred to the station and a new payload, previously stored at the station, attached to stage 3 and dispatched on its high energy mission. Should the redundant stage have been required during the manned portion of the mission, the only additional function required would be refueling stage 3.

3. Operation of launch vehicles with redundant stage to low earth orbit would have the effect of placing large numbers of operational stages in low earth orbit. Using these stages refueled at the space station, in various combinations, with interstage propellant transfer, 1.5 stage and redundant stage would provide extensive capabilities for high energy missions with large payloads.

Using the operational stages which arrive in low earth orbit in these and other ways, in connection with a space station, will provide extensive space operations capabilities.

It will be appreciated that many other advantages and features of the present invention may be obtained. Accordingly, the foregoing description of the present invention and certain of its features and advantages should be considered as illustrative only.

What is claimed is:

1. A multistage launch vehicle having improved reliability, comprising:
 a plurality of parallel burn stages, N in number, including a first stage and a last stage, each stage including a propellant tank and a rocket engine coupled to receive propellant from said propellant tank, the last of said stages carrying a payload, wherein any N−1 stages have sufficient thrust to lift said payload into orbit thereby providing a redundant stage;
 interstage coupling means for releasably coupling the parallel stages;
 means for transferring propellant between at least two of said stages during parallel firing of said at least two stages; and
 payload coupling means for releasably coupling the payload to at least two of said parallel stages, said interstage coupling means and said payload coupling means being selectively separable to reconfigure the launch vehicle in response to a benign failure.

2. An improved multistage launch vehicle as set out in claim 1, wherein said means for transferring propellant comprises a propellant line from said first stage propellant tank to said last stage rocket engine.

3. An improved multistage launch vehicle as set out in claim 1, wherein said means for transferring propellant comprises a propellant line from said first stage propellant tank to said last stage.

4. An improved multistage launch vehicle as set out in claim 3, wherein said means for transferring propellant further comprises valve means for controlling propellant flow between said first stage propellant tank and said last stage.

5. An improved multistage launch vehicle as set out in claim 4, wherein said valve means provides propellant from said last stage propellant tank to said last stage rocket engine only after the propellant in said first stage propellant tank is expended.

6. An improved multistage launch vehicle as set out in claim 1, wherein said last stage propellant tank has a smaller capacity than said first stage propellant tank.

7. A multistage parallel burn launch vehicle having improved reliability, comprising:

a first stage having a propellant tank and a rocket engine;

a second stage having a propellant tank and a rocket engine;

a third stage having a propellant tank and a rocket engine;

a payload;

first interstage coupling means for releasably coupling said first and second stages;

second interstage coupling means for releasably coupling said first and third stages;

third interstage coupling means for releasably coupling said second and third stages;

first payload coupling means for releasably coupling said second stage and said payload; and second payload coupling means for releasably coupling said third stage and said payload, said first, second and third interstage coupling means, and said first and second payload coupling means being selectively separable to reconfigure the launch vehicle in response to a benign failure.

8. A launch vehicle as set out in claim 7, further comprising:

a fourth stage;

fourth interstage coupling means for coupling said second and fourth stages; and fifth interstage coupling means for coupling said third and fourth stages.

9. A launch vehicle as set out in claim 7, wherein means said interstage coupling means comprise explosive bolts mechanically coupling portions of the respective stages.

10. A launch vehicle as set out in claim 7, further comprising means for transferring propellant between said first and second stages.

11. A launch vehicle as set out in claim 7, further comprising means for transferring propellant between said first and third stages.

12. A launch vehicle as set out in claim 7 further comprising means for transferring propellant between said second and third stages.

13. An improved multistage launch vehicle, comprising:

a first stage having a propellant tank and a rocket engine;

a second stage having a propellant tank and a rocket engine;

a third stage, having a propellant tank and a rocket engine, said third stage being axially aligned with and mounted on said second stage in a series stage configuration;

a payload, axially aligned with and mounted to said third stage;

a first coupling means for releasably coupling said first and second stages; and a second coupling means for releasably coupling said first and third stages;

wherein said first and second coupling means being selectively separable to reconfigure the launch vehicle in response to a benign failure.

14. A launch vehicle as set out in claim 13, further comprising means for providing interstage propellant transfer between said first stage and said second stage.

15. A method for improving the reliability of a parallel staged launch vehicle having $N-1$ stages and a payload, comprising the steps of:

providing an additional Nth stage, releasably coupled to each of said $N-1$ staged and selectively separable to reconfigure the launch vehicle in response to a benign failure; and providing sufficient propellant in said N stages such that $N-1$ stages of said N stages has sufficient thrust and propellant to lift said payload into earth orbit;

wherein each stage includes a propellant tank and a rocket engine coupled to receive propellant from said propellant tank.

16. A method as set out in claim 15, further comprising the step of pumping propellant between at least two of said N stages while said at least two stages are burning in parallel.

17. A method as set out in claim 15 further comprising the step of, upon failure of one of said N stags, decoupling said failed stage from the remaining $N-1$ stages and jettisoning said failed stage.

18. A launch vehicle as set out in claim 1, further comprising means for shielding at least one of said stages from a catastrophic failure in another of said stages.

19. A launch vehicle as set out in claim 7, further comprising means for shielding at least one of said stages from a catastrophic failure in another of said stages.

* * * * *